(12) United States Patent
Heintz et al.

(10) Patent No.: US 10,060,657 B2
(45) Date of Patent: Aug. 28, 2018

(54) HEATING, VENTILATION AND/OR AIR-CONDITIONING DEVICE WITH TARGETED POWER-SUPPLY MANAGEMENT

(75) Inventors: Bruno Heintz, Paris (FR); Jean-Marc Oury, Paris (FR); Hugues Lefebvre De Saint Germain, Sainte-Foy-Lès-Lyon (FR); Pierre Bivas, Le Vesinet (FR); Mathieu Bineau, Versailles (FR)

(73) Assignee: VOLTALIS, Paris (FR)

( * ) Notice: Subject to any disclaimer, the term of this patent is extended or adjusted under 35 U.S.C. 154(b) by 1126 days.

(21) Appl. No.: 14/125,406

(22) PCT Filed: Jun. 12, 2012

(86) PCT No.: PCT/FR2012/000238
§ 371 (c)(1),
(2), (4) Date: Apr. 9, 2014

(87) PCT Pub. No.: WO2012/172193
PCT Pub. Date: Dec. 20, 2012

(65) Prior Publication Data
US 2014/0290905 A1   Oct. 2, 2014

(30) Foreign Application Priority Data

Jun. 15, 2011 (FR) .................... 11 01830

(51) Int. Cl.
*F25B 1/00* (2006.01)
*F25B 49/00* (2006.01)
(Continued)

(52) U.S. Cl.
CPC ............ *F25B 29/003* (2013.01); *F24F 11/83* (2018.01); *H02J 3/14* (2013.01); *F24F 11/46* (2018.01);
(Continued)

(58) Field of Classification Search
CPC .......... F25B 29/003; F24F 11/008; H02J 3/14
(Continued)

(56) References Cited

U.S. PATENT DOCUMENTS 4,345,162 A * 8/1982 Hammer ............ G05D 23/1913
307/35
5,687,139 A * 11/1997 Budney .............. G05D 23/1923
307/141.4
(Continued)

FOREIGN PATENT DOCUMENTS

EP   1 950 507   7/2008
EP   1 953 473   8/2008
(Continued)

OTHER PUBLICATIONS

Translation of Written Opinion of the International Searching Authority (dated Dec. 15, 2013) in corresponding PCT application, PCT/FR2012/000238, retrieved from the internet on Nov. 26, 2016 from the WIPO official website.*
(Continued)

*Primary Examiner* — Ljiljana Ciric
(74) *Attorney, Agent, or Firm* — Young & Thompson

(57) ABSTRACT

A ventilation or air-conditioning device includes a first component for generating heat or cold, a programmer second component, a power supply circuit shared by the first and second components, and a controller for the power supply circuit. The first and the second components cooperate to output air at a selected temperature. The device includes a relay for cutting off the supply of power to the first component. The relay is activated separately from the controller, and is arranged in the circuit such that the supply of power to the second component is independent of the state of activation of the relay.

12 Claims, 1 Drawing Sheet

(51) Int. Cl.
*F25B 29/00* (2006.01)
*H02J 3/14* (2006.01)
*F24F 11/83* (2018.01)
*F24F 11/65* (2018.01)
*F24F 11/46* (2018.01)
*F24F 11/47* (2018.01)

(52) U.S. Cl.
CPC .............. *F24F 11/47* (2018.01); *F24F 11/65* (2018.01); *H02J 2003/143* (2013.01); *Y02B 70/3225* (2013.01); *Y02B 70/3266* (2013.01); *Y02B 70/3275* (2013.01); *Y04S 20/222* (2013.01); *Y04S 20/242* (2013.01); *Y04S 20/244* (2013.01)

(58) Field of Classification Search
USPC ...................................................... 62/228.1
See application file for complete search history.

(56) References Cited

U.S. PATENT DOCUMENTS

| | | | | |
|---|---|---|---|---|
| 6,158,230 | A * | 12/2000 | Katsuki | F24F 1/0003 361/22 |
| 6,220,043 | B1 * | 4/2001 | Chaney, Jr. | F24F 11/008 62/126 |
| 7,420,293 | B2 * | 9/2008 | Donnelly | H02J 3/14 307/34 |
| 8,364,322 | B2 | 1/2013 | Oury et al. | |
| 9,389,599 | B2 * | 7/2016 | Yun | G05B 13/02 |
| 9,927,157 | B2 * | 3/2018 | Benson | F25B 27/02 |
| 9,927,824 | B2 * | 3/2018 | Nakakita | G05F 1/66 |
| 2004/0255601 | A1 | 12/2004 | Kwon et al. | |
| 2005/0016191 | A1 * | 1/2005 | Butler | F24F 11/008 62/158 |
| 2005/0210897 | A1 * | 9/2005 | Oomura | B60H 1/3216 62/186 |
| 2007/0209377 | A1 * | 9/2007 | Beifus | F24F 1/0003 62/178 |
| 2007/0299562 | A1 * | 12/2007 | Kates | H02J 3/14 700/295 |
| 2009/0157529 | A1 * | 6/2009 | Ehlers | F24F 11/0012 705/26.1 |
| 2010/0038966 | A1 * | 2/2010 | Espeut, Jr. | H01H 9/26 307/68 |
| 2010/0043469 | A1 * | 2/2010 | Lifson | F25B 49/025 62/228.1 |
| 2011/0264286 | A1 * | 10/2011 | Park | G06Q 10/00 700/286 |
| 2011/0282504 | A1 * | 11/2011 | Besore | H02J 3/14 700/291 |
| 2012/0029717 | A1 * | 2/2012 | Cox | H02J 3/14 700/295 |
| 2012/0053745 | A1 * | 3/2012 | Ng | H02J 3/14 700/295 |
| 2012/0109395 | A1 * | 5/2012 | Finch | G06Q 50/06 700/295 |
| 2014/0088776 | A1 * | 3/2014 | Brandt | H02J 3/32 700/295 |
| 2014/0088777 | A1 * | 3/2014 | Allmaras | H02J 3/32 700/295 |
| 2015/0000318 | A1 * | 1/2015 | Pinto | F25B 1/00 62/228.1 |
| 2015/0171775 | A1 * | 6/2015 | Cho | F25B 49/025 62/228.1 |
| 2015/0354843 | A1 * | 12/2015 | Towsley | F24F 11/0012 165/209 |
| 2016/0359325 | A1 * | 12/2016 | Kawata | H02J 3/14 |
| 2017/0086281 | A1 * | 3/2017 | Avrahamy | H05B 37/0272 |

FOREIGN PATENT DOCUMENTS

EP 2 048 757 4/2009
FR 2 904 486 2/2008

OTHER PUBLICATIONS

International Search Report dated Oct. 24, 2012 in corresponding PCT application.

* cited by examiner

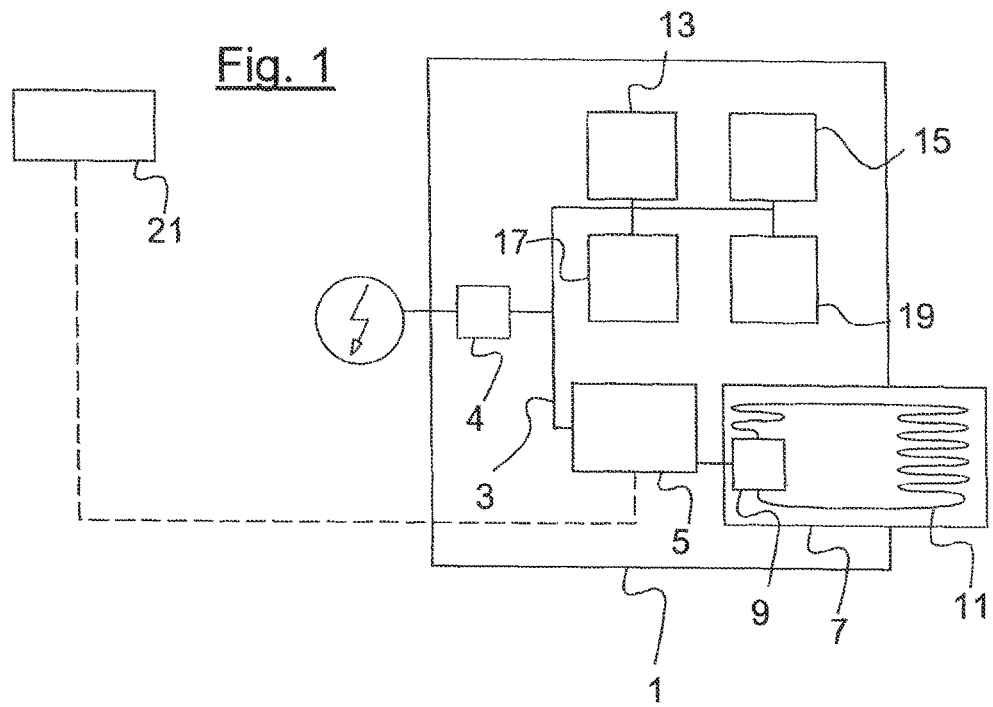
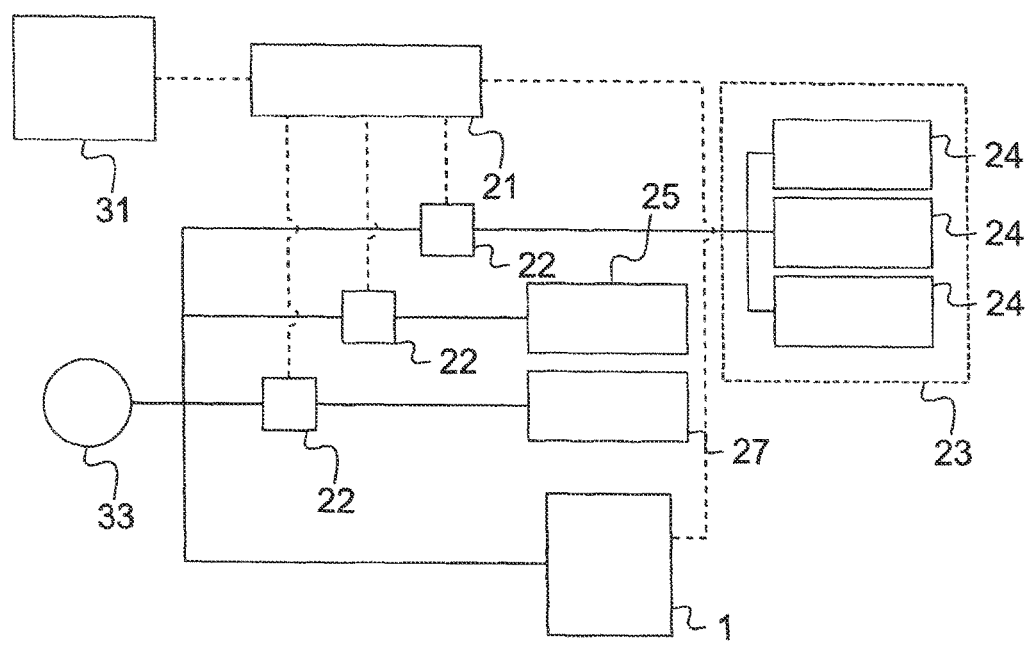

HEATING, VENTILATION AND/OR AIR-CONDITIONING DEVICE WITH TARGETED POWER-SUPPLY MANAGEMENT

BACKGROUND OF THE INVENTION

Field of the Invention

The present invention relates to a heating, ventilation and/or air-conditioning device. This type of device is conventionally referred to by its acronym HVAC. The invention relates to heating devices, to air-conditioning devices and to combinations thereof.

Current energy costs require power consumption to be managed carefully and in a controlled manner. This management is necessary both on the scale of the electrical apparatuses themselves and in the power networks supplying them. Regulation of consumption on the power grid on the scale of a region or a country can include actions on a local scale, for example on a plurality of dwellings.

Description of the Related Art

Existing systems for managing energy consumption have various forms. From the most simple domestic electric heating thermostat to the centralised management of entire blocks of flats, these systems allow the power supply to electrical apparatuses to be controlled according to instructions received.

The applicant has already proposed a method for the real-time management and modulation of power consumption in the French patent published under number FR 2 904 486. This method on the one hand allows the power consumption of a multiplicity of final users to be analysed and compared with the energy production available on the network at each moment. On the other hand, this method allows the power supply to certain electrical apparatuses of those final users to be selectively modulated.

Modulation of the power supply coupled with analysis of the consumption of a large number of users allows the power consumption to be adapted to the production available at a given moment. In other words, instead of increasing energy production in the event of an increase in demand, it becomes possible to offset that increase by reducing consumption at certain locations on the network. This is known as "distributed load shedding".

Distributed load shedding allows sudden variations in energy needs (for example in the early evening during winter) to be minimised in order to limit the financial consequences of energy peaks. These are usually compensated for by bringing inactive production equipment into operation or by purchasing from a foreign network. Both solutions are very expensive.

This method has proved itself. Nevertheless, it involves regular interruptions in the power supply. This is not compatible with some electrical apparatuses containing fragile electronic components which do not withstand sudden and repeated interruptions in the power supply.

The method is also incompatible with some electrical apparatuses which have to store data. Some apparatuses are designed to be supplied with power, even in standby mode, in order to retain the information contained in their internal memory. An interruption in the power supply such as that provided by the method of the applicant may compromise that memory and cause malfunctions.

Yet other apparatuses have a use such that an interruption in the power supply causes an immediate inconvenience for the user. Here too, these devices are not very compatible with this method.

Consequently, many apparatuses are not used for carrying out the method. This deprives it of some of its effectiveness, and limits the possible savings which can be made, both in terms of energy and financially.

Moreover, to date, there does not exist a harmonised set of controls between the various air conditioner and other heating, ventilation and/or air-conditioning models. Control thereof by generic equipment is therefore complicated, and there is no reliable solution.

SUMMARY OF THE INVENTION

The present invention is going to improve the situation described above.

The heating, ventilation and/or air-conditioning device comprising at least a first component for generating heat and/or cold, at least a second component, a power supply circuit common to the first and second components, and a controller for the power supply circuit. The first and second components cooperate to output air at a chosen temperature. The device is remarkable in that it further comprises a relay for cutting off the power supply to the first component. The relay can be activated independently of the controller and can be arranged in the power supply circuit so that the power supply to the second component is independent of the activation state of the relay.

This device is particularly advantageous because it allows the power supply within an apparatus to be modulated selectively. Some components can therefore be controlled by a system that is external to the electrical apparatus itself. These components can be modulated temporarily without negative consequences for the apparatus or for the user. At the same time, the power supply to certain other components, for which a permanent power supply is necessary or the switching off of which is undesirable, can be maintained. Fragile electronic components can thus be protected from an interruption in the power supply.

Such a device is not affected by problems of standardisation of the controllers of the apparatuses because it acts directly on the power supply to the components that are to be controlled. The components are chosen so that the stoppage thereof does not cause any inconvenience. In other words, the device permits an intermediate operating mode of the apparatus. This intermediate operating mode can be activated remotely by an external control member.

This type of device is particularly suited to the field of heating, ventilation and/or air-conditioning devices, for example programmable electric heaters or air conditioners. The operation of devices according to the invention is of particular interest in combination with methods and systems for the real-time management and modulation of power consumption, for example the method mentioned above. However, the device of the invention may be used with other similar methods.

The invention can take the form of a kit comprising the heating, ventilation and/or air-conditioning device and the driver configured to drive the device. The driver can be controlled remotely by a system for the real-time management and modulation of power consumption.

BRIEF DESCRIPTION OF THE DRAWING FIGURES

Other features and advantages of the invention will become apparent from studying the detailed description below and the accompanying drawings, in which:

FIG. 1 is a schematic view of the device of the invention,

FIG. 2 is a schematic view of the device of FIG. 1 in a circuit carrying out the method of document FR 2 904 486.

The accompanying drawings are mainly of a certain nature and may not only serve to supplement the invention but also contribute to the definition thereof, where appropriate.

DETAILED DESCRIPTION OF THE INVENTION

In the embodiment shown in FIG. 1, the heating, ventilation and/or air-conditioning device 1 is an air conditioner. The air conditioner 1 comprises a power supply circuit 3, a controller 4 for the power supply circuit 3, a relay 5, a heat exchanger 7, and a plurality of accessory components 13, 15, 17 and 19. In the example described here, the controller 4 is a manual switch. In a variant, the controller 4 can be remote-controlled and/or automatic. The heat exchanger 7 comprises a component for generating cold. In the example shown, the component for generating cold comprises a compressor 9 which forms part of a closed coolant circuit 11. The accessory components include, in the example described here, a programmer 13 and air distribution fans 15, 17 and 19. The compressor 9 of the heat exchanger 7 as well as the accessory components 13, 15, 17 and 19 are supplied with power by way of the power supply circuit 3. The relay 5 is arranged electrically between the power supply source and the compressor 9 of the heat exchanger 7.

Operation of the air conditioner 1 is controlled by the programmer 13. In the example described here, the programmer 13 is integrated into the air conditioner 1 and is dedicated thereto. In a variant, the programmer 13 can be separate and can communicate with the air conditioner 1 by any known means. The programmer 13 can likewise control a group of air conditioners similar to the air conditioner 1. The programmer 13 can also control other apparatuses, for example heaters.

The relay 5 has at least an "open" position and a "closed" position. In the closed position, the relay 5 is equivalent electrically to a closed switch and allows current to pass between the power supply source, the power supply circuit 3 and the compressor 9 of the heat exchanger 7. The air conditioner 1 is in conventional operating mode, which permits the simultaneous operation of all its components. When the heat exchanger 7 is activated, the cold-generating function is operational, as are the fans 15, 17 and 19. The air conditioner 1 is able to output air at the temperature set by the programmer 13.

In the open position, the relay 5 functions as an open switch and prevents current from passing between the power supply circuit 3 and the compressor 9 of the heat exchanger 7. The air conditioner 1 is then in "economy" operating mode, and the power supply to the compressor 9 is stopped. The circulation of the coolant in the closed circuit 11 is stopped. Because the relay 5 is coupled only to the compressor 9 in the power supply circuit 3, the open position of the relay 5 does not affect the power supply to the accessory components 13, 15, 17 and 19. The relay 5 is therefore arranged in the power supply circuit 3 in such a manner that the power supply to the accessory components 13, 15, 17 and 19 is independent of the activation state of the relay 5. Air stirring by the air conditioner 1 by means of the fans 15, 17 and 19 therefore remains possible, and control of the operation of the air conditioner 1 by the programmer 13 and/or by the controller 4 is maintained.

Operation of the air conditioner 1 with the relay 5 in the open position provides for air stirring but no longer provides for cooling of the air. Such an operating mode allows a sensation of freshness to be maintained for the user by virtue of the stirring, while stopping the energy consumption of the compressor 9.

In the case of established use of the air conditioner 1, that is to say around a set temperature of the programmer 13, the compressor 9 of the heat exchanger 7 can be stopped for a short period of time, for example for approximately half an hour, without the user noticing a loss of comfort. If, on the other hand, the fans 15, 17 and 19 were to be stopped for that same short period of time, stopping of air stirring and of the compressor 9 would result in an increase in temperature and stagnation of the air. This would lead to a very rapid and noticeable loss of comfort for the user. The economy operating mode therefore allows a considerable energy saving to be made while maintaining the sensation of environmental freshness for the user.

This operating mode therefore limits the total consumption of the air conditioner 1 to the energy consumed by the accessory components 13, 15, 17 and 19. This is advantageous from an energy point of view, because the compressor 9 is generally the component of the air conditioner 1 that consumes the most energy.

In other words, in economy mode, the convection of air provides for comfort, that is to say thermal well-being. That convection, within an enclosed space, promotes heat exchange between the body, here that of the user, and the ambient air. In this mode, the air conditioner 1 does not necessarily lower the actual average temperature of the room. By contrast, that temperature is made uniform throughout the room by ventilation, which optimises heat exchange.

In the embodiment shown in FIG. 1, operation of the relay 5 is controlled remotely by a driver 21. Communication between the driver 21 and the relay 5 can be carried out by communication means of the relay 5. These means can comprise, for example, a wired connection, a transmitter/receiver by PLC (power line communication), radio waves, WiFi, infra-red or by any other suitable means.

Activation, that is to say opening, of the relay 5 by the driver 21, or its deactivation, that is to say closing of the relay 5, can follow from direct programming of the driver 21 by the user. Commands for the driver 21 can be programmed remotely when the driver 21 is connected to an external network, for example by virtue of a GPRS modem and an antenna (not shown) and/or by virtue of a connection to an ADSL modem (by WiFi, PLC or the like). Commands for the driver 21 can also be programmed beforehand in an internal memory of the driver 21.

In a variant, the relay 5 can comprise a circuit capable of measuring the power consumption of the compressor 9. This measurement can be carried out by means of an induction loop. These data can be sent by way of the communication means of the relay 5 to the driver 21 for processing thereby. In other embodiments, other elements can be used for the measuring circuit.

The driver 21 can also control other electrical apparatuses comprising a relay 5, air conditioners or the like. In the example shown here, the driver 21 is of the box type described in the French patent published under number FR 2 904 486.

The heating, ventilation and/or air-conditioning device of the invention can be obtained by fitting the relay 5 into any air conditioner, electrically upstream of the compressor 9 of the heat exchanger 7 and downstream of the power supply source. It is therefore possible to adapt existing air conditioners. The relay 5 can likewise be integrated into the electric circuit of the air conditioner 1 at the design stage. The relay 5 can be driven independently of the controller 4 of the power supply circuit 3 of the device 1, and its state does not depend on the operating mode thereof. This means that intervention by the user on a control means for the device 1, distinct from the driver 21, does not affect the relay 5.

Fitting of the relay 5 into existing air conditioners comprises the electrical connection of the relay 5. For practical and aesthetic reasons, fitting preferably comprises the physical arrangement of the relay 5 inside the air conditioner. Such an operation is quick, simple and inexpensive. The small size of the relay 5, and the simplicity of the electrical connection, permit adaptation to the very large majority of the air conditioner models already available on the market.

Such fitting retains the pre-existing control systems of the air conditioner, for example the controllers, remote controls or other user interfaces. The invention makes it possible to avoid the problems of adaptation to the various communication standards adopted by the different manufacturers by acting directly on the internal power supply of the components.

The electrical modulation effected by way of the relay 5 retains the information stored in the programmer 13. Because the compressor 9 is generally relatively insensitive to sudden variations in the electric current, the electrical modulation therefore does not affect the fragile electronic components of the air conditioner 1.

In a variant, the heating, ventilation and/or air-conditioning device 1 can be an electric radiator. In this case, the device is similar to that of FIG. 1, except that the heat exchanger 7 comprises a component for generating heat, for example an electrical resistance heating element. The compressor 9 and the closed coolant circuit 11 can be replaced in this variant by a heating element. Operation of the relay 5 is similar to that of the air conditioner of FIG. 1: the heating apparatus can be modulated in a controlled manner independently of the controller 4 of the power supply circuit 3 of the device. For example, even with the relay 5 in the open position, the fans and/or thermostats, which are considered to be accessory components, can continue to operate. The electric radiator may likewise not include a fan and include only a thermostat while remaining within the scope of the invention.

FIG. 2 shows a schematic diagram of an installation comprising the device 1 of FIG. 1 coupled to a driver 21. The driver 21 also controls the power supply to apparatuses 25 and 27, and to a group 23 of apparatuses 24. To that end, the driver 21 controls relays 22 which are interposed electrically between a main power supply source 33, for example the main power supply to a house, and the electric circuits of the apparatuses 24, 25 and 27.

By way of example, the electric circuit comprises a group 23 of electric heaters 24, a water heater 25, an inverter 27, and an air conditioner 1 as described by FIG. 1. The relays 22 are connected to the driver 21 by suitable communication channels, for example by a wired connection, by power line communications (PLC), by radio waves, by WiFi, by infrared, or by any other suitable means. The relays 22 function as switches which do or do not permit the supply of power to the apparatuses 24, 25 and 27 or groups of apparatuses 23. The relays 22 can be arranged in the region of the main power supply panel, on the power supply channels chosen to supply power to the apparatuses that are to be controlled. The power supply line to the air conditioner 1 does not have a relay 22 because the air conditioner 1 must not be deprived of power for the reasons detailed above. On the other hand, the driver 21 is also in communication with the relay 5 (not shown in FIG. 2) of the air conditioner 1. It is clear that the device 1 and the driver 21 can be sold and/or fitted together or separately, and therefore form a kit.

According to the method of the French patent published under number FR 2 904 486, a central server 31 manages a plurality of drivers similar to the driver 21, which are distributed in a plurality of residences. The central server 31 sends instructions for short-term modulation, for approximately ten minutes, to some of the drivers 21, according to the adaptation of consumption that is desired. The drivers 21 that are to apply a modulation are alternated so as to reduce the total consumption on a long-term basis while limiting the duration of the modulation generated by each of the drivers 21.

The invention makes it possible to reduce substantially the power consumption of a climate management apparatus without significantly reducing the effectiveness thereof, and to generate localised power supply interruptions of short duration in an apparatus while protecting chosen electronic components.

The invention can be used with the very large majority of existing heating, ventilation and/or air-conditioning apparatuses, with a minor intervention. The cost of fitting the relay into existing devices is offset by the energy savings that are achieved. The invention permits economical operation of the devices according to the invention and centralisation of the driving of those operating modes. Such an apparatus permits centralised driving on the scale of a dwelling or a very large group of dwellings.

What is claimed is:

1. A heating, ventilation or air-conditioning device comprising:
    a first component for generating heat or cold;
    a second component;
    a power supply circuit common to the first and second components;
    a controller for the power supply circuit, the first and second components cooperating to output air at a chosen temperature; and
    a relay for cutting off the power supply to the first component, the relay can be activated independently of the controller and is arranged in the power supply circuit so that the power supply to the second component is independent of the activation state of the relay.

2. The heating, ventilation or air-conditioning device according to claim 1, wherein the first component comprises a compressor.

3. The heating, ventilation or air-conditioning device according to claim 1, wherein the first component comprises a heating element.

4. The heating, ventilation or air-conditioning device according to claim 1, wherein the second component comprises a programmer device.

5. The heating, ventilation or air-conditioning device according to claim 1, wherein the second component comprises at least one fan.

6. The heating, ventilation air-conditioning device according to claim 1, wherein the relay comprises a circuit adapted for measuring the power consumption of the first component.

7. The heating, ventilation or air-conditioning device according to claim 1, wherein the relay comprises a communicator comprising at least one of a wired connection, power line communications, radio waves, WiFi by or infrared.

8. A kit comprising the heating, ventilation or air-conditioning device according to claim 1 and a driver configured to control a relay of said heating, ventilation or air-conditioning device.

9. The kit according to claim 8, wherein the driver is able to drive other relays.

10. The kit according to claim 8, wherein the driver is controlled remotely by a system for the real-time management and modulation of power consumption.

11. The heating, ventilation or air-conditioning device according to claim 2, wherein the first component comprises a heating element.

12. The kit according to claim 9, wherein the driver can be controlled remotely by a system for the real-time management and modulation of power consumption.

* * * * *